United States Patent [19]

Chanroo

[11] Patent Number: 5,093,925
[45] Date of Patent: Mar. 3, 1992

[54] THREE DIMENSIONAL CELLULAR COMMUNICATION SYSTEM WITH COORDINATE OFFSET AND FREQUENCY REUSE

[75] Inventor: Keith A. Chanroo, Coral Springs, Fla.

[73] Assignee: Motorola, Inc., Schaumburg, Ill.

[21] Appl. No.: 514,465

[22] Filed: Apr. 25, 1990

[51] Int. Cl.⁵ .............................................. H04Q 7/02
[52] U.S. Cl. ........................................ 455/33; 455/34; 379/59
[58] Field of Search ..................... 455/33, 34, 50, 56, 455/63, 66; 379/58, 59, 60, 61, 62, 63

[56] References Cited

U.S. PATENT DOCUMENTS

| | | | |
|---|---|---|---|
| 4,249,181 | 2/1981 | Lee | 455/57 |
| 4,456,793 | 6/1984 | Baker et al. | 455/606 |
| 4,667,202 | 5/1987 | Kammerlander et al. | 455/33 |
| 4,771,448 | 9/1988 | Koohgoli et al. | 455/33 |
| 4,790,000 | 12/1988 | Kinoshita | 379/59 |

Primary Examiner—Reinhard J. Eisenzopf
Assistant Examiner—Lisa Charouel
Attorney, Agent, or Firm—Thomas G. Berry; Vincent B. Ingrassia

[57] ABSTRACT

A three dimensional cellular communication system comprising a plurality of cells arranged in a multi-level environment to reduce interference and improve frequency reuse in both horizontal and vertical directions by offsetting cells stacked on different levels of the multi-level environment.

14 Claims, 5 Drawing Sheets

THREE DIMENSIONAL CELLULAR COMMUNICATION SYSTEM WITH COORDINATE OFFSET AND FREQUENCY REUSE

FIELD OF THE INVENTION

This invention relates in general to cellular communication systems, and more specifically, to cellular communication systems having cells arranged in three dimensions.

BACKGROUND OF THE INVENTION

A radio communication system, such as existing two dimensional cellular communication systems, comprise a plurality of cells arranged to reduce interference and improve frequency reuse primarily in two dimensions (i.e., one horizontal plane). However, current two dimensional cellular systems have failed to satisfy the communicational needs within multi-level structures. Within multi-level structures, users produce a very high localized density demand that quickly exhaust the capacity of the current cellular systems. The problem is further compounded, because in two dimensional systems the radii of cells are much larger than the sizes of the multi-level structures and more than one multi-level structures may be contained within a single cell radius.

Additionally, the capacities of existing cellular communication systems are quickly exceeded because these systems do not discriminate between users on different levels of multi-level structures. That is, these cellular systems assign channels of the same frequencies to all the users in a localized area, irrespective of what level of the structure a particular user may be on. Thus, the high demand indicative of multi-level structures (e.g., busy office building, hospital, banks, and hotels etc.) quickly frustrates the current two dimensional cellular systems, rendering them ineffective in these multi-level environments because too many out going calls are blocked.

In multi-level structures, the users of the conventional wire line telephone systems consistently miss calls if their jobs require a high degree of mobility. Secretaries frequently experience difficulty in locating their supervisors and co-workers because they are never where they were supposed to be. Individuals that miss important calls may choose to carry pagers, but pagers do not satisfy the need for full-duplex (i.e., two-way) mobile communication. Therefore, an effective alternate communication system is needed for the conventional wire line desk telephone that provides full-duplex communication. This system, while satisfying the mobility of users as the existing two dimensional cellular systems, should resolve the problems associated with localized density and high frequency demands that are placed upon these system by users within multi-level structures.

Thus, what is needed is a three dimensional cellular system to satisfy the much needed communication service for this highly localized density of people (e.q., within multi-level structure) whose movements are not restricted in two dimensions, but are consistently characterized by vertical and horizontal directions (i.e., three dimensional).

SUMMARY OF THE INVENTION

In carrying out the invention in one form, there is provided a radio telephone system comprising a three dimensional cellular communication system comprising a plurality of cell arranged in three dimension.

DETAILED DESCRIPTION OF THE INVENTION

Figure 1:
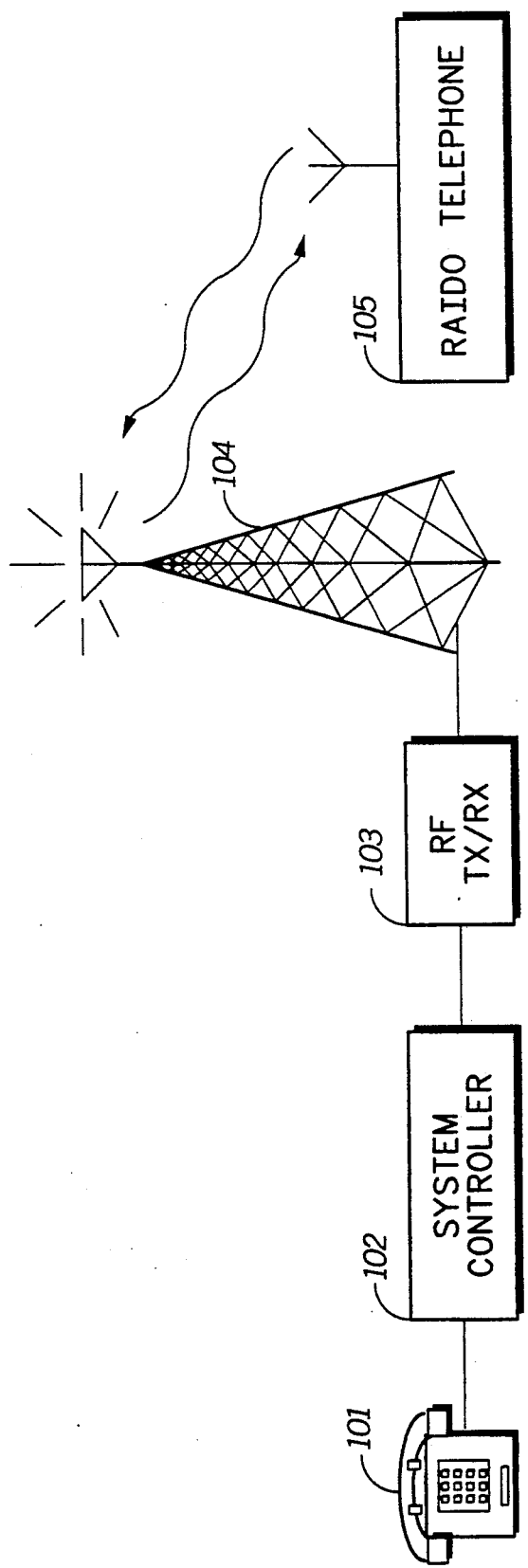
FIG. 1 is a system diagram of a two dimensional cellular communication system.

Referring to FIG. 1, a conventional cellular communication system comprises a telephone 101 connected by a public or private telephone network to a system controller 102. The system controller 102 oversees the operation of the radio frequency transmitter/receiver 103 and encodes and decodes the inbound and outbound addresses into known formats that are compatible to the respective land line and cellular radio telephone addressing requirements. Telephony signals are transmitted to and received from a radio telephone 105 by at least one antenna 104 coupled to the radio frequency transmitter/receiver 103.

Figure 2A:
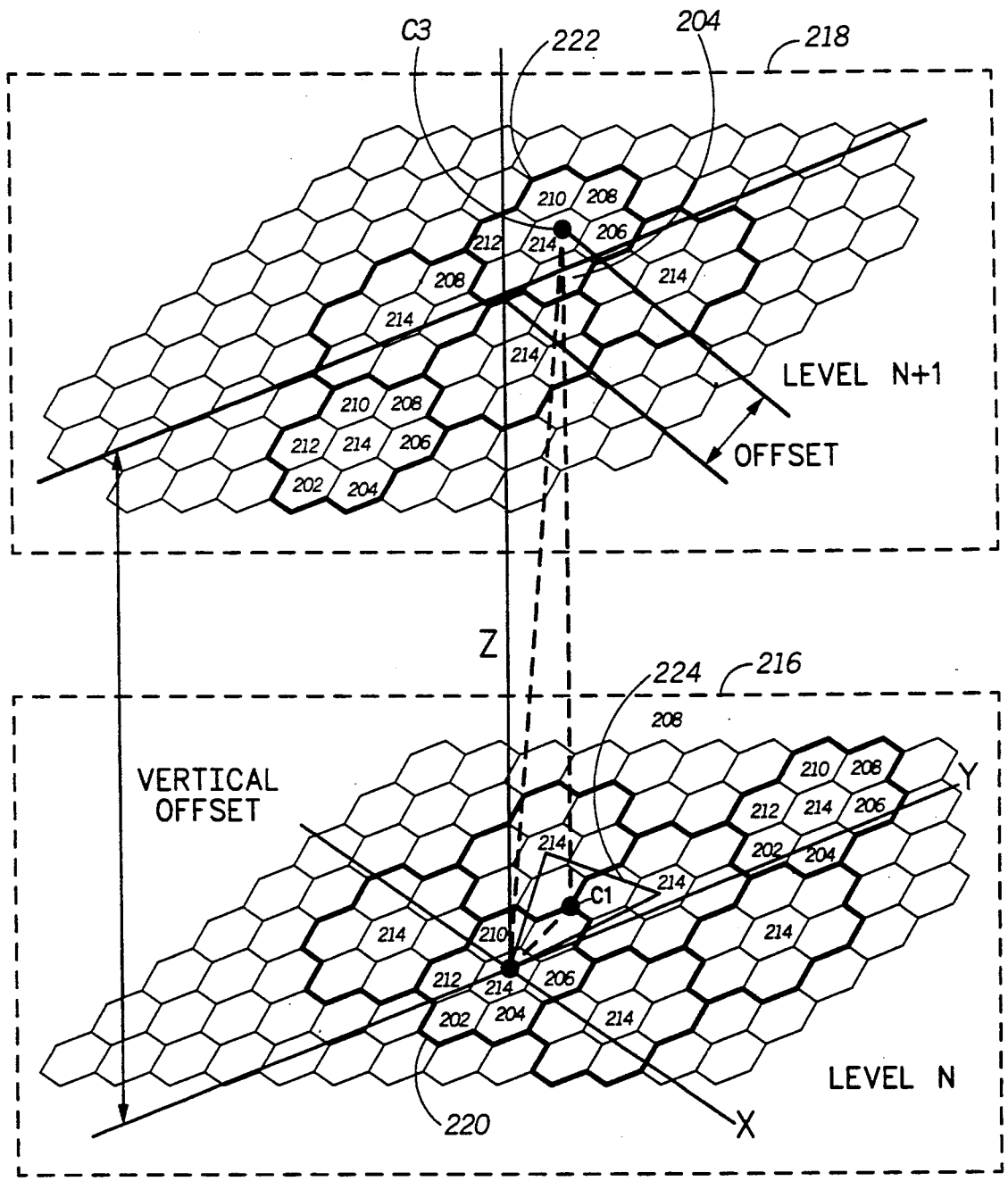
FIG. 2A is an isometric view of a first embodiment of the present invention.

According to the isometric view of a preferred embodiment of the invention in FIG. 2A, level N illustrates a cellular communication system comprising a plurality of cells 216. Level N also includes a plurality of cell clusters 220, which contains cells 202, 204, 206, 208, 210, 212, and 214. The illustrated cluster 220 shows a seven cells per cluster arrangement, which represents one of the several examples of cluster types known to those skilled in the art. Similarly, Level N+1 of FIG. 2A illustrates a similar communication system comprising similar plurality of cells 218, and cell clusters 222 which contains cells 202, 204, 206, 208, 210, 212, and 214.

A cell (e.g., cell 214) comprises a pre-defined area for communication having at least one transmitter and one receiver (e.g., communicators), and all similarly numbered cells 214 are located at a fixed distance from all other similarly numbered cells 214. This distance between co-channel cells are set by the selected cluster size 220 (e.g., 3, 4, 7, 9 and 12 cells per cluster etc.) and the radius of the cells. All similarly numbered cells are referred to as co-channel cells spaced sufficiently apart to facilitate simultaneous communication in at least two or more said similarly numbered cells without causing undue interferences to its neighboring co-channel cells. Each cell (e.g., cell 214) within a given cluster contains a unique frequency or set of frequencies that may be different from the frequencies of the other cells 202, 204, 206, 208, 210, and 212 that are contained within the said cluster 220.

According to FIG. 2A, the second plurality of cells 218 is stacked above the first plurality cells 216, and is offset in at least one of the three dimensions to increase frequency reuse while minimizing interference. This arrangement comprises a preferred embodiment of a three dimensional system.

Referring still to FIG. 2A, an isometric view of a first embodiment of the invention shows one of several methods of offsetting the next plurality of cells in a multi-level environment. The offset of each vertically separated level of cells may be determined in at least one of the three dimensions (shown as X, Y, and Z coordinates). The triangular outline 224 illustrates one such method used in determining the offset to the next vertical co-channel cell 214. The triangular outline 224 is drawn connecting the three closest neighboring co-channel cells 214. The center C1 of the triangular outline determines the offset in the X and Y plane. Beginning from the center C1 of the reference level N and shifting vertically upwards to the next level N+1, the center C3 is determined for a next co-channel cell 214 of a second plurality of cells on said multi-level structure. The other cells may then be positioned around the co-channel cell 214 to complete a similar plurality of cells as shown in Level N+1 of FIG. 2A.

In existing two dimensional cellular systems, the frequencies are effectively constrained only in the X and Y coordinates to allow frequency reuse in the horizontal directions because all cells or neighboring co-channel cells are located on the same horizontal plane (i.e., in two dimensions). However, the present invention contemplates that communication in three dimensions requires the frequencies to be constrained in the X, Y, and Z coordinates. This results in additional frequency reuse in the third dimension. This additional frequency constraint in the third dimension by the present invention (e.g., the Z coordinate) allows users of this system to move vertically because superior frequency reuse can now be introduced in the vertical direction. The user still experiences clear and reliable communication that is available in the existing two dimensional system, because co-channel cells located on different vertical levels are sufficiently spaced apart to reduce interference.

Figure 2B:
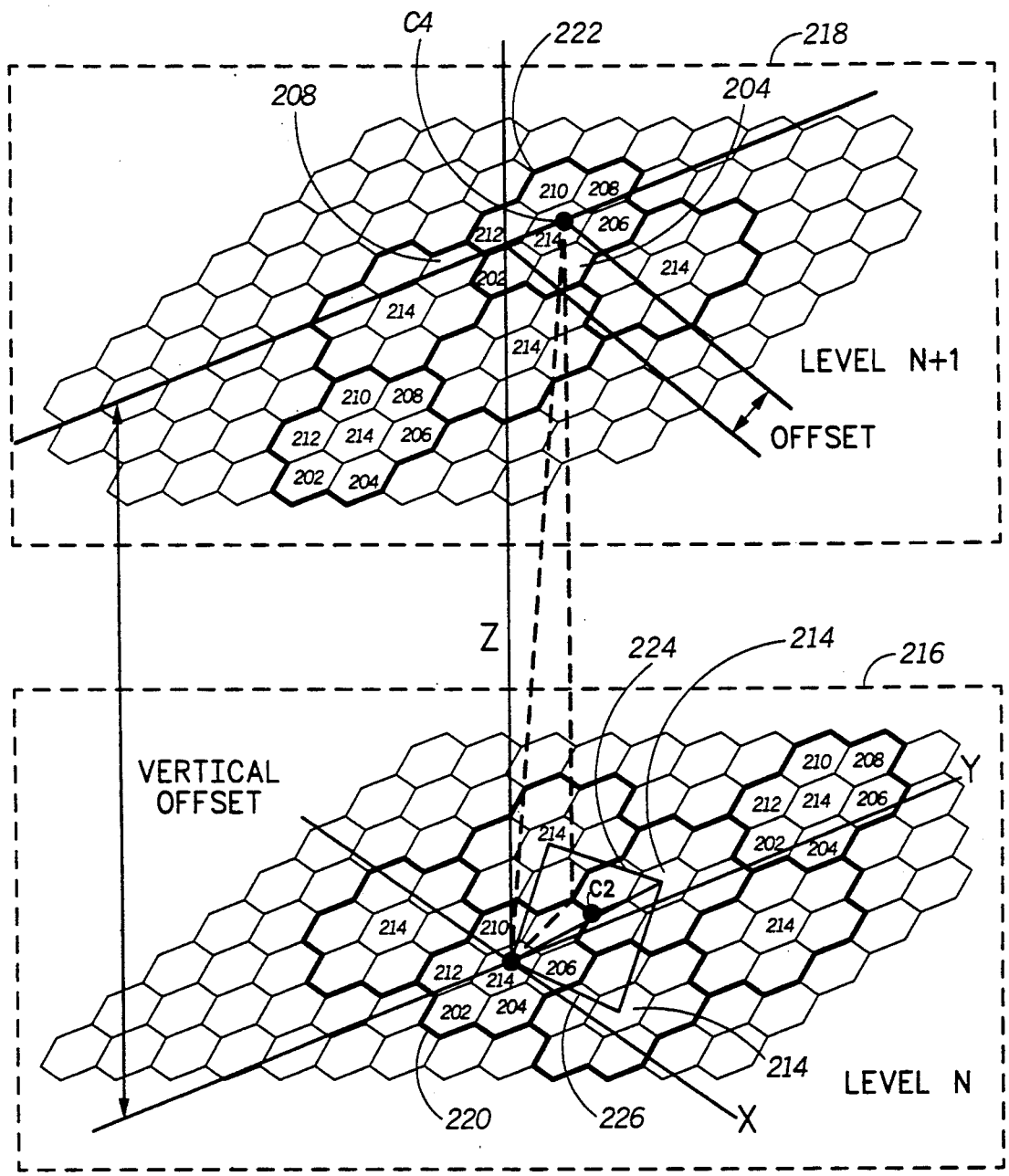
FIG. 2B is an isometric view of FIG. 2A.

Referring to FIG. 2B, an isometric view of a second embodiment of the invention is shown. The second method used in determining the offset to the next vertical co-channel cell 214 involves the uses of the trapezoidal outline 226. The trapezoidal outline 226 is drawn connecting the four closest neighboring co-channel cells 214. The center C2 of the trapezoidal outline determines the first offset in the X and Y plane on the reference level N. Beginning at the center C2 and shifting vertically upwards to the next level N+1, the center C4 is determined for a next co-channel cell 214 on another level N+1. The other cells may then be positioned around the co-channel cell 214 on Level N+1 to complete a similar plurality of cells as shown in Level N+1 of FIG. 2B.

Figure 3:
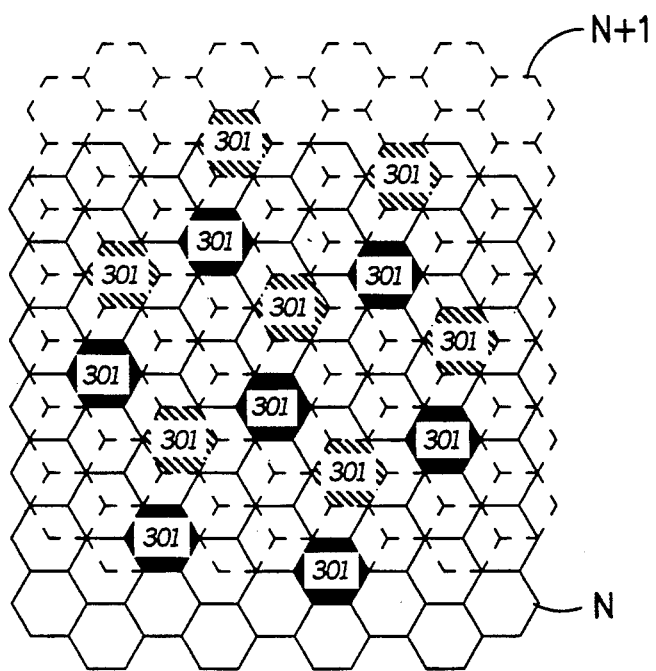
FIG. 3 is a plan view of a first embodiment of the present invention.

FIG. 3 shows a plan view of the two level embodiment shown in FIG. 2A. In this figure, the offset of the two levels to achieve vertical frequency reuse is more clearly seen. The first level N is shown with solid lines having co-channel cells 301 with the solid black background. The second level N+1 is shown with broken lines having co-channel cells 301 with right hatched background. The placement of level N+1 above level N is determined according to the triangular offset method described above and comprising a repeatable two-level system.

Figure 4:
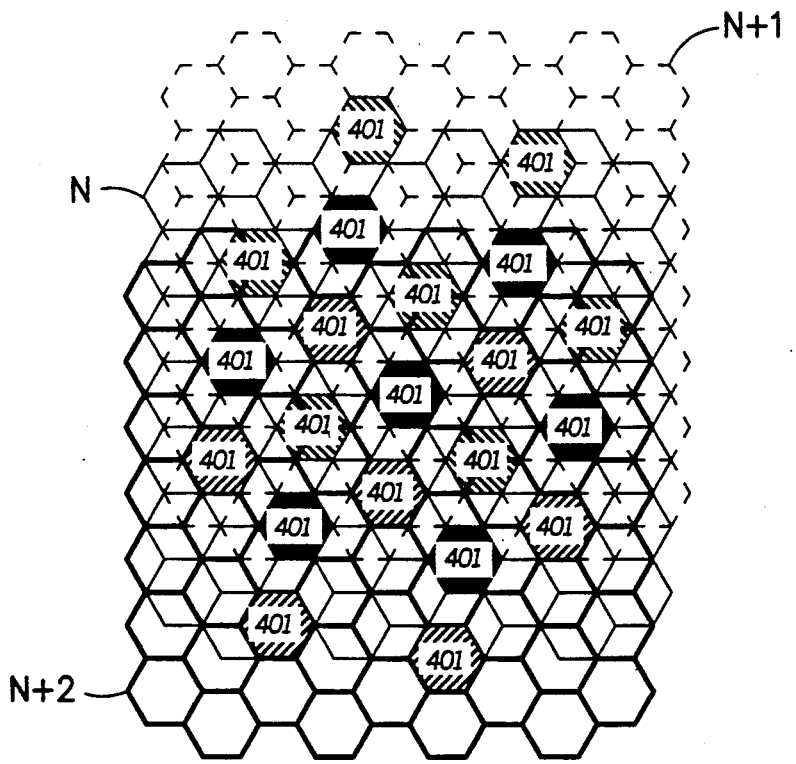
FIG. 4 is a plan view of a third embodiment of the present invention.

The plan view of FIG. 4 was also created by using the said triangular method, and shows a third embodiment of the present invention for three levels of vertical co-channel cells. Co-channel cells 401 on the first level N are shaded with the black background. Co-channel cells 401 on the second level N+1 are shaded with right hatched background. Finally, co-channel cells 401 on the third level N+2 are shaded with left hatched background to provide a three level embodiment of the present invention. Again the offset between the levels is clearly seen. The triangular method of offsetting co-channel cells 401 on a multi-level structure results in a unique repeatable three-level system with symmetrically placed co-channel cells 401. Producing this third embodiment with the symmetrical three-level repeatable patterns is extremely desirable in those communication systems providing ubiquitous communication in any multi-level environment.

Alternately, using the trapezoidal method of offsetting co-channel cells on different levels results in a fourth embodiment of the present invention which is shown in the plan view of FIG. 6. This method, as described above, maybe repeated to provide the four level system shown in the figure. This arrangement produces four levels having symmetrical patterns that are repeatable to provide coverage within any multi-level structure. Co-channel cells 501 (with the solid black background) is shown on the first level N. Co-channel cells 501 (with the right hatched background) is shown on the second level N+1. Co-channel cells 501 (with the left hatched background) is shown on the third level N+2. Co-channel cells 501 (with the zigzaged background) is shown on the fourth level N+3. Thus, the trapezoidal method results in a symmetrical four-level repeatable unit of co-channel cells 501 while the triangular method results in a symmetrical three-level repeatable unit of co-channel cells. When using either method of cell placement, coverage of different sizes multi-level structures may be accomplished by placing the repeatable units of cells above, below, and adjacent to each other to extend coverage over the entire structure.

Figure 5:
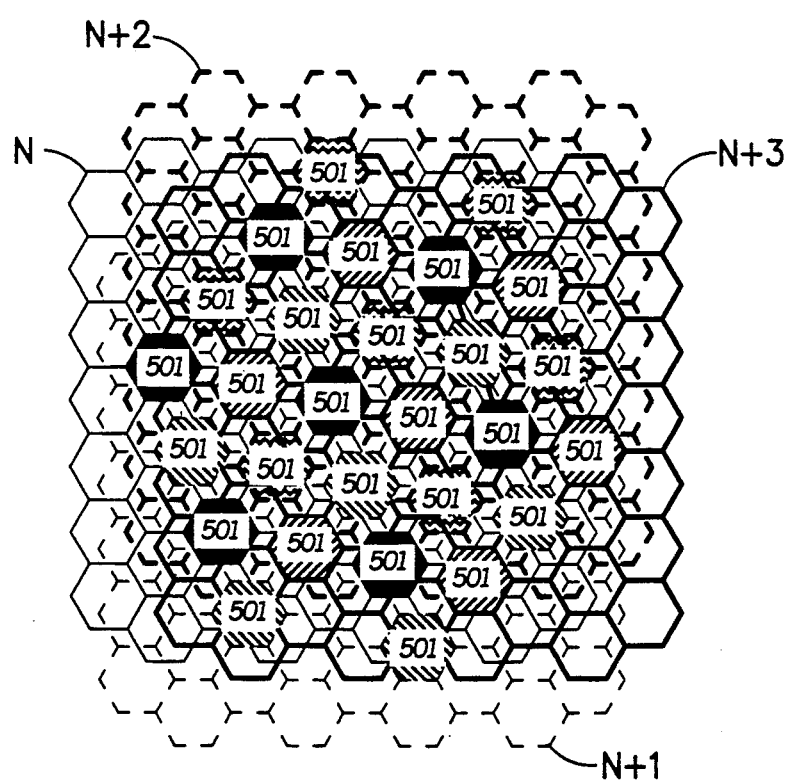
FIG. 5 is a plan view of a fourth embodiment of the present invention.

In a two dimensional (e.g., uni-level) cellular system, it is known that the carrier-to-interference (C/I) can be increased by increasing the number of cells per cluster. However, in a multi-level system, the C/I may not be increased by simply increasing the number of cells per cluster, because in doing so strict attention has to be paid to the stacked levels that are above and below a particular level to increasing the C/I performance. Using the three-level symmetrical pattern of the triangular method (see FIG. 4) and the four-level symmetrical pattern of the trapezoidal method (see FIG. 5) the C/I may be increased by using a larger number of cells per cluster if the vertical offset of the floors are not to short. The vertical offset between floors are considered too short when the co-channel interference produced from the vertical offset cells dominate the total C/I and the C/I cannot be effectively increased by increasing the number of cells per cluster. However, if the distances between levels are too short, cells may be placed on alternative levels (e.g., skipping every other level when placing offset cells). In doing this, both the horizontal and vertical distances are increased, and the attenuation in all three dimensions may be equalized by matching the vertical and horizontal system performance by measuring the C/I in all three dimensions.

Therefore, to increase C/I performance the distances in all three dimensions must be increased proportionally to maintain equalized performance. This may be accomplished by increasing the number of cell per cluster and placing cell on alternative levels if the distances between different vertical levels are too short. If the vertical height between cells are not increased the stacked cells (e.g., cell above and below a reference level) may dominate the interference resulting in little or no change in C/I with increasing cluster sizes.

The triangular and trapezoidal techniques discussed herein facilitate reduced frequency spectrum requirement in satisfying the communication needs of multi-level structures. Depending on the availability of spectrum and the propagation characteristics of a multi-level structure, an appropriate method of offsetting co-channel cells may be chosen to correspond to the C/I required for an appropriate modulation scheme of a given system. That is, if availability of frequency is not too restricted and the distances between levels do not produce severe interference then the trapezoidal method may be preferred. However, the preference of one method over the other method is dependent upon the environment and may best be chosen by simulation and/or field testing. Other offset techniques may be used but may provide non-symmetrical patterns.

In summary, a three dimensional cellular communication system is provided by stacking cells in an offset manner to accommodate frequency reuse in the vertical direction. A repeatable multi-level arrangements of this system are defined in all three dimensions to provide continuous and symmetrical communication throughout the multi-level environment. The triangular and trapezoidal methods disclosed herein readily solves the problems encountered when expanding cell in three dimensions by resolving the cell offset placement in all three dimensions to achieve symmetrical units which can be repeated to achieve continuous communication throughout a multi-level system.

I claim:

1. A three dimensional cellular communication system comprising:
   a first planar level having a first plurality of cells; and
   a second planar level having a second plurality of cells similarly arranged as the first plurality of cells and having an offset in first, second and third co-ordinates from the first plurality of cells, wherein the first and second plurality of cells have a multiple of predetermined clusters having a predetermined number of cells, each of the multiple of predetermined clusters having a cluster size determining the offset in the first and the second co-ordinates, and wherein the offset in the third co-ordinate is determined by a vertical distance between the first planar level and the second planar level.

2. The three dimensional cellular communication system according to claim 1 wherein the offset in the first, second, and third co-ordinates is further determined in accordance with an improved frequency reuse for each cells of the first and second plurality of cells.

3. The three dimensional cellular communication system according to claim 1 wherein the offset in the first, second, and third co-ordinates is further determined in accordance with a reduced signal interference between each cells of the first and second plurality of cells.

4. In a structure having at least first and second levels, a three dimensional cellular communication system comprising:
   a first plurality of cells on the first planar level; and
   a second plurality of cells on the second planar level similarly arranged as the first plurality of cells and having an offset in first, second and third co-ordinates from the first plurality of cells, wherein the first and second plurality of cells have a multiple of predetermined clusters having a predetermined number of cells, each of the multiple of predetermined clusters having a cluster size determining the offset in the first and the second co-ordinates, and wherein the offset in the third co-ordinate is determined by a vertical distance between the first planar level and the second planar level.

5. The structure according to claim 4 wherein the offset in the first, second, and third co-ordinates is further determined in accordance with an improved frequency reuse for each cells of the first and second plurality of cells.

6. The structure according to claim 4 wherein the offset in the first, second, and third co-ordinates of the first plurality of cells from the second plurality of cells is further determined in accordance with a reduced signal interference therebetween.

7. A three dimensional cellular radio system comprising:
   a first plurality of communicators, each providing a communication area defining one of a first plurality of cells in a first, second, and third dimensions, the first plurality of communicators for communicating by a first signal on a first planar level; and
   a second plurality of communicators, each providing a communication area defining one of a second plurality of cells in a first, second, and third dimensions, the second plurality of communicators for communicating by a second signal on a second planar level, the first plurality of communicators being offset in first, second and third co-ordinates from the second plurality of communicators for minimizing the interference therebetween, wherein the first and second plurality of cells have a multiple of predetermined clusters having a predetermined number of cells, each of the multiple of predetermined clusters having a cluster size with first and second co-ordinates determining the offset in the first and the second dimensions, and wherein the offset in the third dimension is determined by a vertical distance between the first planar level and the second planar level.

8. The three dimensional cellular radio system according to claim 7 wherein the first and second signals comprise substantially the same frequency.

9. The three dimensional cellular radio system according to claim 7 wherein the three dimensional cellular radio system comprises a cellular telephone system and the first and second plurality of communicators comprise transceivers.

10. The three dimensional cellular radio system according to claim 7 wherein the first plurality of cells are contiguous to one another and the second plurality of cells are contiguous to one another.

11. The three dimensional cellular radio system according to claim 7 wherein the first plurality of cells are contiguous to the second plurality of cells.

12. A method comprising:
   communicating by a first signal, having a frequency, from a first plurality of communicators in first, second, and third dimensions; and
   communicating by a second signal, having substantially the same frequency, from a second plurality of communicators in the first, second, and third dimensions, wherein the first plurality of communicators is offset in first, second and third co-ordinates from the second plurality of communicators for maximizing frequency reuse in the first, second, and third dimensions, wherein the first and second plurality of communicators have a communication area defined by one of a first and second plurality of cells, wherein the first and second plurality of cells have a multiple of predetermined clusters having a predetermined number of cells, each of the multiple of predetermined clusters having a cluster size with first and second co-ordinates determining the offset in the first and the second dimensions, and wherein the offset in the third dimension is determined by a vertical distance between the first and second plurality of communicators.

13. The method according to claim 12 wherein both communicating steps comprise communicating by the first and second signals having substantially the same frequency.

14. The method according to claim 12 wherein the first communicating step comprises communicating on a first level of a structure and the second communicating step comprises communicating on a second level of the structure.

* * * * *